US012112337B1

(12) United States Patent
Pope et al.

(10) Patent No.: US 12,112,337 B1
(45) Date of Patent: *Oct. 8, 2024

(54) SYSTEMS AND METHODS FOR AUTOMATICALLY DETERMINING RECALLED PRODUCTS FROM UNSTRUCTURED RECALL DATA

(71) Applicant: Prodigo Solutions Inc., Cranberry Township, PA (US)

(72) Inventors: Dermot Pope, Gibsonia, PA (US); Marlin Doner, Gibsonia, PA (US); Michael DeLuca, Gibsonia, PA (US); Aaron Manuel, Cranberry Township, PA (US)

(73) Assignee: Prodigo Solutions Inc., Cranberry Township, PA (US)

( * ) Notice: Subject to any disclaimer, the term of this patent is extended or adjusted under 35 U.S.C. 154(b) by 571 days.

This patent is subject to a terminal disclaimer.

(21) Appl. No.: 16/995,013

(22) Filed: Aug. 17, 2020

Related U.S. Application Data

(63) Continuation of application No. 15/225,320, filed on Aug. 1, 2016, now Pat. No. 10,762,511.

(60) Provisional application No. 62/199,704, filed on Jul. 31, 2015.

(51) Int. Cl.
*G06Q 30/014* (2023.01)
(52) U.S. Cl.
CPC .................................. *G06Q 30/014* (2013.01)
(58) Field of Classification Search
CPC .................................................. G06Q 30/014
See application file for complete search history.

(56) References Cited

U.S. PATENT DOCUMENTS

| 9,715,666 | B2 | 7/2017 | Beier |
| 10,296,916 | B2 | 5/2019 | Maraz |
| 10,762,511 | B1 | 9/2020 | Pope |
| 2011/0093400 | A1 | 4/2011 | Waite |
| 2011/0119142 | A1* | 5/2011 | Maraz .................. G06Q 20/202 705/302 |
| 2012/0005105 | A1 | 1/2012 | Beier et al. |
| 2013/0036061 | A1 | 2/2013 | Alexander |
| 2013/0085894 | A1* | 4/2013 | Chan ...................... G06Q 30/02 705/26.62 |
| 2013/0246217 | A1 | 9/2013 | Denton |
| 2015/0032639 | A1* | 1/2015 | Cherifi ................. G06Q 30/014 705/303 |

OTHER PUBLICATIONS

"OpenFDA provides ready access to recall data"; Taha Kass-Hout, MD, MS; Aug. 2014, 3 pages (Year: 2014) (Year: 2014).*
"A simple way to check for recalls", Auctiva.com, Apr. 2011, 2 pages (Year: 2011).

(Continued)

*Primary Examiner* — Dennis W Ruhl
(74) *Attorney, Agent, or Firm* — SNELL & WILMER L.L.P.

(57) ABSTRACT

Systems and methods for automatically determining recalled products from unstructured recall data. In exemplary embodiments, fuzzy logic is used to determine recalled products from unstructured recall data. In exemplary embodiments, natural language algorithms with an embedded data grammar dictionary are used to extract item identifiers and manufacturer name from unstructured recall data.

17 Claims, 11 Drawing Sheets

(56) References Cited

OTHER PUBLICATIONS

"OpenFDA provides ready access to recall data"; Taha Kass-Hout, MD, MS; Aug. 2014, 3 pages (Year: 2014).
USPTO; Restriction/Election Requirement dated Nov. 16, 2018 in U.S. Appl. No. 15/225,320.
USPTO; Non-Final Office Action dated Jun. 14, 2019 in U.S. Appl. No. 15/225,320.
USPTO; Final Office Action dated Jan. 24, 2020 in U.S. Appl. No. 15/225,320.
USPTO; Notice of Allowance dated Jun. 9, 2020 in U.S. Appl. No. 15/225,320.

* cited by examiner

Search Parameters: Parker Labs

FDA JSON Sample Payload

```
{
  "meta": {
    "disclaimer": "openFDA is a beta research project and not for clinical use. While
we make every effort to ensure that data is accurate, you should assume all results
are unvalidated.",
    "license": "http://open.fda.gov/license",
    "last_updated": "2015-05-01",
    "results": {
      "skip": 0,
      "limit": 50,
      "total": 35
    }
  },
  "results": [
    {
      "recall_number": "Z-0131-2015",
      "reason_for_recall": "Package inserts have incorrect SmartWash parameters for
Triglyceride.",
      "status": "Ongoing",
      "distribution_pattern": "Worldwide Distribution: US (nationwide) and countries
of: Algeria, Angola, Argentina, Armenia, Australia, Austria, Bangladesh, Belgium,
Bosnia and Herzegovina, Brazil, Bulgaria, Canada, Chile, China, Columbia, Croatia,
Czech Republic, Dominican Republic, Egypt, Estonia, France, Germany, Greece,
Guatemala, Hungary, India, Indonesia, Iraq, Ireland, Israel, Italy, Jamaica, Jordan,
Kenya, Kuwait, Kyrgyzstan, Latvia, Lebanon, Libya, Lithuania, Luxembourg, Moldova,
Montenegro, Morocco, Netherlands, New Zealand, Norway, Pakistan, Panama, Paraguay,
Philippines, Poland, Portugal, Qatar, Republic of Yemen, Romania, Saudi Arabia,
Senegal, Serbia, Slovenia, South Africa, South Korea, Spain, Sweden, Switzerland,
Taiwan, Thailand, Trinidad and Tobago, Tunisia, Turks and Caicos, Turkey, Uganda,
United Arab Emirates, United Kingdom, and Uruguay.",
      "product_quantity": "11916 units",
      "recall_initiation_date": "20140407",
      "state": "TX",
      "event_id": "67987",
      "product_type": "Devices",
      "product_description": "Lipase Reagent, 7D80.\n\nUsed to measure lipase in human
serum on the Architect system.",
      "country": "US",
      "city": "Irving",
      "recalling_firm": "Abbott Laboratories, Inc",
      "report_date": "20141105",
      "@epoch": 1424553174.836488,
      "voluntary_mandated": "Voluntary: Firm Initiated",
      "classification": "Class II",
      "code_info": "lots 43827UQ12, 43819UQ03, 44449UQ05, 44127UQ06, 44334UQ07,
43994UQ07, 44596UQ08, 44775UQ09, and 44930UQ11.",
      "@id": "19a7ce904cc7b112c3a642f2d852d0de33bdc1d446814a747b9ea7077766ae19",
      "openfda": {},
      "initial_firm_notification": "Letter"
    }
  ]
}
```

Fig. 9

SYSTEMS AND METHODS FOR AUTOMATICALLY DETERMINING RECALLED PRODUCTS FROM UNSTRUCTURED RECALL DATA

CROSS-REFERENCE TO RELATED APPLICATIONS

This application is a continuation of U.S. application Ser. No. 15/225,320, filed Aug. 1, 2016 which claims priority to, and any other benefit of U.S. Provisional Application No. 62/199,704, filed Jul. 31, 2015, the entire disclosures of both of which are hereby incorporated by reference in their entireties.

BACKGROUND

The present disclosure generally relates to the field of online product procurement systems. The present disclosure relates more specifically to systems and methods of identifying a request from a user for a product, determining whether a recall has been issued for the product, and, if so, informing the use that the desired product has been recalled and, optionally, identifying one or more substitute products to the user as alternative products.

Many organizations utilize searchable electronic catalogs to present customers goods and/or services from supply chain-approved vendors of the organization. To support purchasing functionality, these catalogs may be consolidated into a marketplace whereby requesters view product details prior to purchasing, and purchase products in a single interface. As item information changes, such as item price and/or item availability, suppliers must maintain the catalog content through, in many instances, manual data administration. In addition, Healthcare supply chain organizations rely on third-party stakeholders to provide supplemental data points such as FDA recall event information or contracted pricing from the Group Purchasing Organizations [GPO]. FDA recall events are typically implemented manually.

In Healthcare, patient safety is of paramount importance. Applicants have appreciated that out-of-date product data might inadvertently provide a user with the ability to order and purchase an item that is already subject to a recall event by the FDA. Applicants have appreciated that, in cases where delivery of an item is time sensitive for a patient procedure, out-of-date product data might allow the requester to order items that are actually subject to a valid recall event, manufacturer's voluntary notice, or other adverse ordering status, such as back-ordered, discontinued, replaced or substituted product from the vendor.

Applicants have thus appreciated that there is a need for a data aggregation service with automated methods for data collection and an apparatus for data synchronization across disparate/remote data stores.

SUMMARY

Systems and methods are provided for automatically determining recalled products from unstructured recall data. In exemplary embodiments, fuzzy logic is used to determine recalled products from unstructured recall data. In exemplary embodiments, natural language algorithms with an embedded data grammar dictionary are used to extract item identifiers and manufacturer name from unstructured recall data, creating a temporary table of matching candidate item records with updated attributes, i.e., with corrected or normalized item identifiers and manufacturer names.

In one embodiment of the invention, a computer implemented method for identifying to a user a substitute product corresponding to a recalled requested product is provided. The method includes storing data identifying products subject to a recall; storing data identifying, for a plurality of products, respective substitute products; storing contract threshold data identifying, for a plurality of users, respective contract terms indicating favorable contract thresholds for specific products; storing contract history data identifying, for a plurality of users, respective prior purchase activity of specific products having favorable contract thresholds for that user; storing data identifying, for a plurality of products, the availability status of the products as available or unavailable as one of at least backordered, replaced, and discontinued; transmitting signals to display on an electronic display a user interface on a remote computer with which the user can identify a requested product for purchase; receiving data from the user indicating the requested product for purchase; determining, using the data identifying products subject to a recall, whether the requested product is subject to a recall; and if so: transmitting signals to display on the electronic display results indicating that the requested product is subject to a recall and without displaying a user interface with which the user can purchase the requested product; and determining, using the data identifying respective substitute products, whether any substitute products have been identified for the requested product; and if one or more substitute products have been identified for the requested product, treating those as proposed substitute products; identifying, using the data identifying the availability status, which of the proposed substitute products are available; determining, using the data identifying products subject to a recall, whether one or more of the proposed substitute products are subject to a recall and, if so, treating those as unavailable proposed substitute products; for the available proposed substitute products, identifying, using at least the contract threshold data and the contract history data, the available proposed substitute product having the most significant positive effect on the favorable contract thresholds for that user; and for the available proposed substitute product having the most significant positive effect on the favorable contract thresholds for that user, transmitting signals to display on the electronic display results indicating that the available proposed substitute product having the most significant positive effect on the favorable contract thresholds for that user exists as a substitute product for the recalled requested product and to display on the electronic display a user interface on the remote computer with which the user can purchase the available proposed substitute product having the most significant positive effect on the favorable contract thresholds for that user, and without displaying a user interface with which the user can purchase the other available proposed substitute products, if any.

In another embodiment, a computer-implemented method for identifying to a user a substitute product corresponding to a recalled requested product is provided. The method includes storing on one or more non-transitory computer readable storage devices data identifying products subject to a recall; storing on one or more non-transitory computer readable storage devices data identifying, for a plurality of products, respective substitute products; storing on one or more non-transitory computer readable storage devices data identifying, for a plurality of products, the availability status of the products as available or unavailable as one of at least backordered, replaced, and discontinued; transmitting signals to display on an electronic display a user interface on a remote computer with which the user can identify a requested product for purchase; receiving data from the user indicating the requested product for purchase; determining, using the data identifying products subject to a recall, whether the requested product is subject to a recall; if so: transmitting signals to display on the electronic display results indicating that the requested product is subject to a recall and without displaying a user interface with which the user can purchase the requested product; and determining, using the data identifying respective substitute products, whether any substitute products have been identified for the requested product; and if one or more substitute products have been identified for the requested product, treating those as proposed substitute products; identifying, using the data identifying the availability status, which of the proposed substitute products are available; determining, using the data identifying products subject to a recall, whether one or more of the proposed substitute products are subject to a recall and, if so, treating those as unavailable proposed substitute products; for the available proposed substitute products, transmitting signals to display on the electronic display results indicating that the one or more available proposed substitute products exist for the recalled requested product and to display on the electronic display a user interface on the remote computer with which the user can purchase one or more of the available proposed substitute products.

In another embodiment, a computer-implemented method for identifying to a user a substitute product corresponding to a recalled requested product is provided. The method includes: storing on one or more non-transitory computer readable storage devices data identifying products subject to a recall; storing on one or more non-transitory computer readable storage devices data identifying, for a plurality of products, respective substitute products; transmitting signals to display on an electronic display a user interface on a remote computer with which the user can identify a requested product for purchase; receiving data from the user indicating the requested product for purchase; determining, using the data identifying products subject to a recall, whether the requested product is subject to a recall; if so: transmitting signals to display on the electronic display results indicating that the requested product is subject to a recall and without displaying a user interface with which the user can purchase the requested product; and determining, using the data identifying respective substitute products, whether any substitute products have been identified for the requested product; and if so: transmitting signals to display on the electronic display results indicating that one or more substitute items exist for the recalled requested product and to display on the electronic display a user interface on the remote computer with which the user can purchase one or more of the substitute items.

Any of the embodiments may further include: receiving unstructured recall event data payloads; applying a data grammar dictionary to parse key data attributes and values from unstructured recall event data payloads to identify specific products identified as subject to a recall in the unstructured recall event data payloads; and storing on the one or more non-transitory computer readable storage devices corresponding data identifying the specific products identified as subject to a recall in the unstructured recall event data payloads.

In some embodiments, applying a data grammar dictionary to parse key data attributes and values from unstructured recall event data payloads comprises applying fuzzy matching logic using distance algorithms to increase match hit rates on look-up key values based on acceptable distance match thresholds to identify specific products identified as subject to a recall in the unstructured recall event data payloads.

In some of those embodiments, applying a data grammar dictionary to parse key data attributes and values from unstructured recall event data payloads comprises applying a data grammar dictionary to parse manufacturer name and product identifiers from unstructured recall event data payloads to identify specific products identified as subject to a recall in the unstructured recall event data payloads. In some of those embodiments, the transmitting signals steps comprise transmitting HTML code to the remote computer.

In another embodiment, method of providing a substitute medical product offer to a customer is provided. The method includes: receiving a request for a medical product from the customer, wherein the request includes a product identifier of the medical product; providing the request to a search engine; receiving, in response to the providing, a plurality of matching products; identifying a recalled product from the plurality of matching products, wherein the recalled product is identified based on a unique identifier of the recalled matching a unique identifier of a product in a recalled medical item list; identifying one or more key characteristics of the recalled product; determining one or more potential substitute products based on the one or more key characteristics, wherein the one or more substitute products are not included with the plurality of matching products; and providing the customer with a result set, wherein the result set includes a subset of the plurality of matching products, wherein the subset does not include the recalled product, and wherein the results set further includes one or more of the potential substitute products. In some of those embodiments, the recalled medical item list may be determined based on parsing one or more web service recall notifications. In some of those embodiments, the recalled medical item list may be determined based on parsing one or more text-based alert messages. In some of those embodiments, one or more key characteristics may include at least one of manufacturer, cost, and purpose.

In another embodiment . . . [new claim summarized here once finalized]

BRIEF DESCRIPTION OF DRAWINGS

FIGS. 7A-7C are screen shots of an exemplary system before recall data has been used to determine that the target product has been recalled.

FIG. 9 shows exemplary unstructured recall data from the FDA.

An APPENDIX provides exemplary pseudocode for an exemplary implementation of a recall-event engine.

DETAILED DESCRIPTION

This Detailed Description merely describes exemplary embodiments of the invention and is not intended to limit the scope of the claims in any way. Indeed, the invention as claimed is broader than the exemplary embodiments, and the terms used in the claims have their full ordinary meaning, unless an express definition is provided herein.

Figure 1:
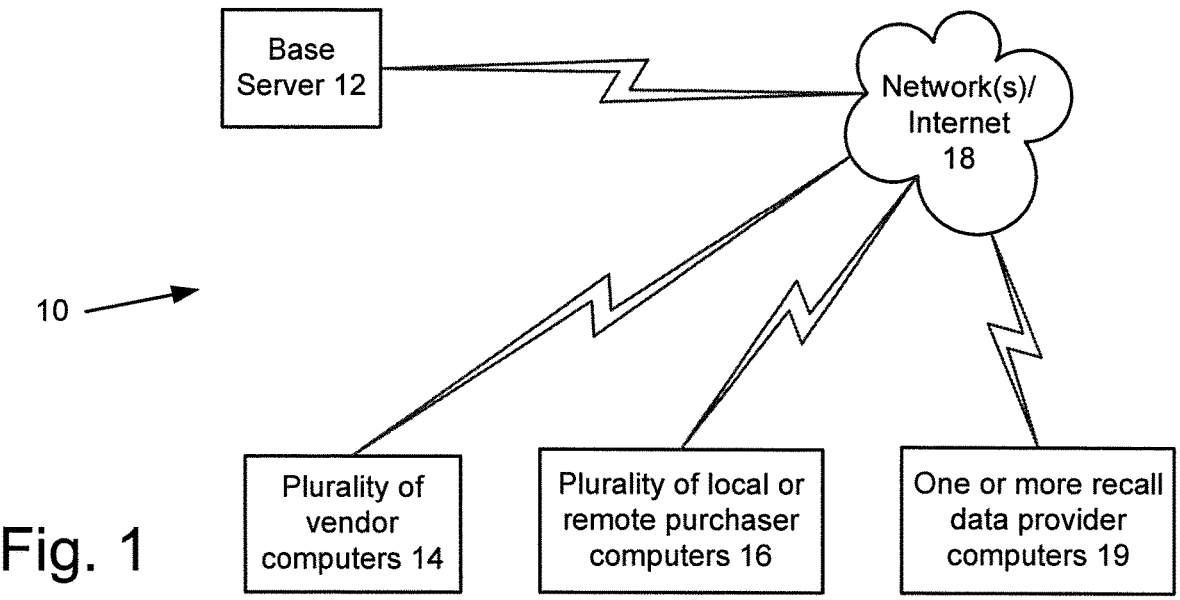
FIG. 1 is a schematic block diagram of an exemplary system having a base server.

Referring now to FIG. 1, a block diagram of an exemplary base system 10 is shown. Exemplary base system 10 provides users with an interface for selecting and purchasing products and receives selections by the users. Base system 10 includes a base server 12 in communication with one or more local or remote vendor computers 14, a plurality of local or remote user computers 16, and one or more recall data providers 19 via one or more wired or wireless communication networks 18, e.g., the Internet. "Computer" or "processor" as used herein includes, but is not limited to, any programmed or programmable electronic device or coordinated devices that can store, retrieve, and process data and may be a processing unit or in a distributed processing configuration. Examples of processors include microprocessors, microcontrollers, graphics processing units (GPUs), floating point units (FPUs), reduced instruction set computing (RISC) processors, digital signal processors (DSPs), field programmable gate arrays (FPGAs), etc. A recall notification provider 19 may be any source of recall information that may be provided to the system 10 to identify products that have been recalled. In exemplary embodiments, one recall data provider computer 19 is the openFDA web service API, to be implemented by the Food and Drug Administration ("FDA").

The base server 12 and/or, the one or more vendor computers 14, the one or more recall data providers 19, and/or the plurality of local or remote user computers 16 have logic for performing the various functions and processes described herein. "Logic," synonymous with "circuit" as used herein includes, but is not limited to, hardware, firmware, software and/or combinations of each to perform one or more functions or actions. For example, based on a desired application or needs, logic may include a software controlled processor, discrete logic such as an application specific integrated circuit (ASIC), programmed logic device, or other processor. Logic may also be fully embodied as software. "Software," as used herein, includes but is not limited to one or more computer readable and/or executable instructions that cause a processor or other electronic device to perform functions, actions, processes, and/or behave in a desired manner. The instructions may be embodied in various forms such as routines, algorithms, modules or programs including separate applications or code from dynamically linked libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. It will be appreciated by one of ordinary skill in the art that the form of software is dependent on, for example, requirements of a desired application, the environment it runs on, and/or the desires of a designer/programmer or the like.

Figure 2:
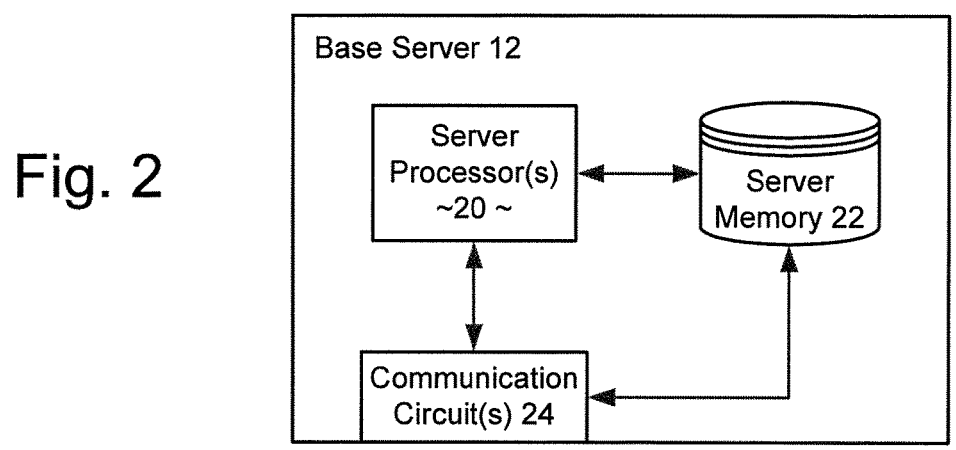
FIG. 2 is a schematic block diagram of an exemplary base server.

Referring now to FIG. 2, an exemplary base server 12 is shown. The base server 12 of FIG. 2 has one or more processors 20 in communication with a server memory 22 and one or more communication circuits 24. Server memory 22 includes one or more non-transitory computer readable media of one or more local or remote data storage devices. As used herein, "data storage device" (synonymous with "memory") means a device for non-transitory storage of code or data, e.g., a device with a non-transitory computer readable medium. As used herein, "non-transitory computer readable medium" mean any suitable non-transitory computer readable medium for storing code or data, such as a magnetic medium, e.g., fixed disks in external hard drives, fixed disks in internal hard drives, and flexible disks; an optical medium, e.g., CD disk, DVD disk, and other media, e.g., ROM, PROM, EPROM, EEPROM, flash PROM, external flash memory drives, etc.

Data for the various processes described herein can be stored on server memory 22 permitting that data to be accessed by the remote user computers 16 over the networks 18 using the communication circuits 24. The software used by the computers 14, 16, 19 to perform the various functions and processes herein can be stored on one or more data storage devices local to the computers 14, 16, 19. Computers 14, 16, 19 can communicate with base server 12 via network 18 utilizing, for example, a web browser or other client software stored in memory accessible by the computers 14, 16, 19. For example, computer 14 may include client software specifically utilized for communication with base server 12. Likewise, computers 16, 19 may have access to software that may be utilized to communicate with base server 12 via network 18.

Figure 3:
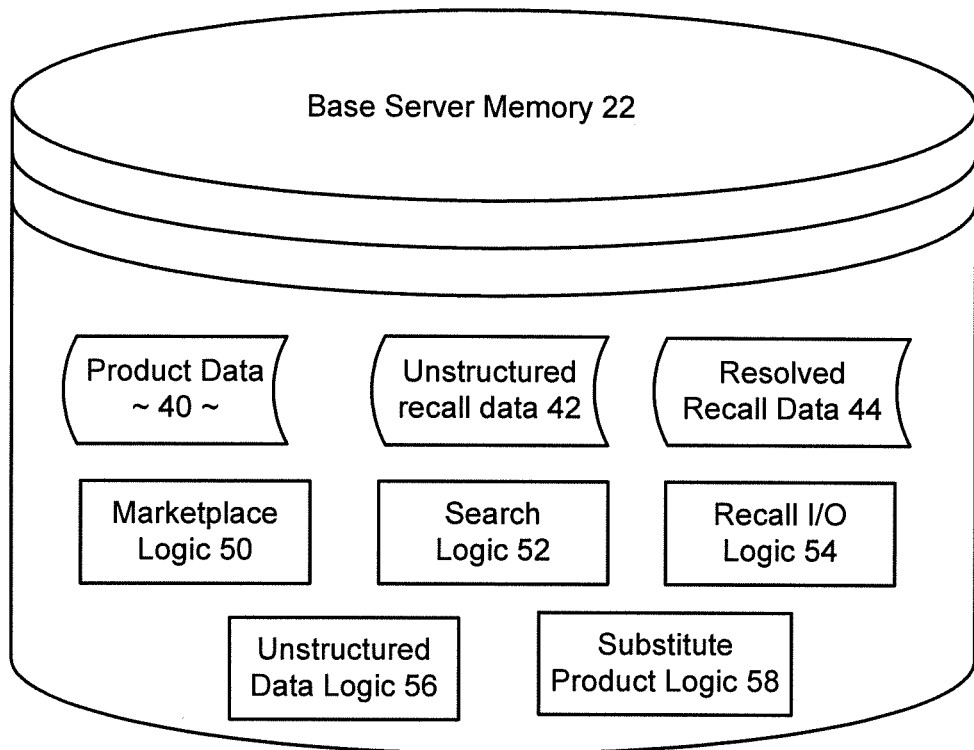
FIG. 3 is a schematic block diagram of an exemplary base server memory.

Referring now to FIG. 3, an exemplary base server memory 22 is shown. Base server memory 22 includes one or more non-transitory computer readable media of one or more local or remote data storage devices having stored thereon (or having a pointer thereto stored thereon) any one or more of the following types of data and logic: product data 40, unstructured recall data 42, resolved recall data 44, marketplace logic 50, search logic 52, recall I/O logic 54, and unstructured data logic 56. "Pointer" and "point to" as used herein in connection with data or software include, but are not limited to, storing on a non-transitory computer readable media of a data storage device one or more data indicating the location on another data storage device from where the data or software can be downloaded or otherwise accessed.

In exemplary embodiments, product data 40 includes for each product all of or any one or more of: a unique product identifier, Product Description(s), Product Attributes, Product Dimensions, Product Count, Unit of Measure, Manufacturer Name, Manufacturer Part #, UPC #, Global Trade Identifier [GTIN], United Nations Standard Products and Services Code [UNSPSC], Product Image(s), Product/Usage Video(s), Latex Indicator, Sterile Indicator, MRI Safe Indicator, Reusable/One-Time Use Indicator, and/or Customer Specific data (CDM, etc.). Product data 40 can include data for locally hosted products and/or punch-out products, i.e., remotely hosted products, e.g., hosted via one or more vendor computers 14. In exemplary systems, product data 40 includes product data 40 for both locally hosted products and punch-out products, or product data 40 for only locally hosted products, or product data for only punch-out products. In exemplary embodiments, marketplace logic 50 provides a virtual market to purchasers, such as purchasers using computers 16. Marketplace logic includes at least search logic 52 that provides a user interface for purchasers to search for products in exemplary system 10, receives a user query for one or more products, queries product data 40 for products corresponding to the user query, and displays select products to in response to the user query.

In exemplary embodiments, recall I/O logic 54 accesses payloads of unstructured recall data 42, e.g., accesses payloads of unstructured recall data 42 from one or more recall data provider computers 19 via network(s)/Internet 18. In exemplary embodiments, unstructured data logic 56 automatically processes unstructured recall data 42 to generate resolved recall data 44, i.e., a recall event in unstructured recall data 42 that has been processed to map the recall event to one and only one product in the product data 40. In exemplary embodiments, search logic 52 uses resolved recall data 44 to modify the display of search results when a query result identifies a recalled product, e.g., by indicating to the user that the queried product has been recalled and, perhaps, offering a substitute item in its place.

In exemplary embodiments, unstructured data logic 56 applies a data grammar dictionary to parse key data attributes and values from payloads of unstructured recall event data 42 identify specific products identified as subject to a recall in the unstructured recall event data 42 and stores on the one or more non-transitory computer readable storage devices corresponding data identifying the specific products identified as subject to a recall in the unstructured recall event data 42 payloads. In exemplary embodiments, the unstructured data logic 56 applying a data grammar dictionary to parse key data attributes and values from unstructured recall event data 42 payloads comprises applying fuzzy matching logic using distance algorithms to increase match hit rates on look-up key values based on acceptable distance match thresholds to identify specific products identified as subject to a recall in the unstructured recall event data payloads. In exemplary embodiments, the unstructured data logic 56 applying a data grammar dictionary to parse key data attributes and values from unstructured recall event data 42 payloads comprises applying a data grammar dictionary to parse manufacturer name and product identifiers from unstructured recall event data payloads to identify specific products identified as subject to a recall in the unstructured recall event data 42 payloads.

In exemplary embodiments, in response to unstructured data logic 56 generating resolved recall data 44 about a particular product, recall I/O logic 54 also sends recall notifications to selected persons, e.g., e-mailing the Product Safety Officers at companies that purchased that particular recalled product, listing, for example, the recalled product, the dates of purchases by that company, the recipients of the purchased goods at the company, the quantity ordered, the previous 12 months order quantity, the ship to destination[s] of the order, and optionally, the received item's associated lot numbers or serial numbers.

Referring back to FIG. 1, vendor computers 14 may include one or more inventory computing systems of vendors of products that may be provided by the system 10 to users. One or more components of base server 12 may identify available products from the one or more vendor computers 14 and store the products in memory as cataloged products in product data 40. The vendor computers 14 may include identifying information related to the products and one or more other data attributes. For example, a cataloged product may be stored with one or more data attributes, such as a product name, description, price, quantity, product code identifier, and/or other attributes that may be utilized by one or more components of the system 10 to identify the product based on a search by a user. The data attributes may be text-based, image-based, and/or may be in some other form that may be utilized to execute one or more search algorithms that may result in a product being identified as a potential match to a user-provided search query. Vendor computers 14 may additional include information related to one or more agreements between the user and the vendor. For example, a vendor computer 14 may provide the system 10 with contract data in the product data 40 that is related to bulk purchasing agreements between the user and the vendor.

Resolved recall data 44 includes information related to specific products that have been identified as being recalled by one or more services. For example, in exemplary embodiments, resolved recall data 44 includes products that were previously available in the catalog of products and which have been identified as recalled via data received from the FDA via a Web Service interface. In some embodiments, products may be designated as recalled products via human curation. For example, one or more of the products may be designated as recalled products by a human that identifies the product via one or more interfaces and designates the product as a recalled product in resolved recall data 44. In some embodiments, resolved recall data 44 includes additional information related to a recall of the product. For example, a recalled product may have associated therewith in resolved recall data 44 (and/or product data 40) a start and/or end date of a recall, geographical information indicating which regions are affected by the recall, and/or information indicating particular lot or part numbers of the product that are affected by the recall.

Figure 4:
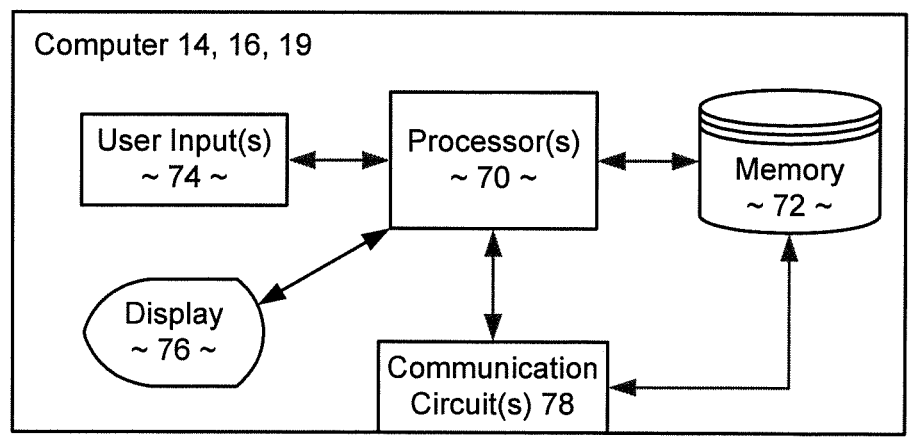
FIG. 4 is a schematic block diagram of an exemplary computer for use with the exemplary base server of FIG. 3.

Referring now to FIG. 4, a block diagram of an exemplary computer 14, 16 is shown. Computers 14, 16, 19 comprise one or more processors 70 in communication with a memory circuit 72, one or more user input circuits 74, a display circuit 76, and one or more communication circuits 78. Memory circuit 72 comprises one or more non-transitory computer readable media of one or more data storage devices. In the context of a handheld computer, this memory circuit might include flash memory and/or RAM and/or ROM memories. In the context of a desktop or laptop computer, this memory circuit might include one or more fixed disk drives and/or RAM and/or ROM memories. Memory circuit 72 will have stored thereon logic modules for performing the various functions and processes described herein or a program to access such logic modules from a remote memory, such as base server memory 22 (e.g., a browser program to access such logic modules from base server memory 22). User input circuits 74 can include any one or more of buttons, keyboards, keys, touchpads, touchscreens, and associated support chips, and/or one or more communication circuits (e.g., RS-232 or USB) for an external keyboard or other external user input device, such as a mouse, track pad, or other pointing device, or other user input devices. Display circuit 76 can include any one or more of LEDs, NxM textual displays, matrix displays on which a graphical user interface ("GUI") can be presented, e.g., a color or monochrome liquid crystal display ("LCD") or organic light-emitting diode ("OLED") display, with associated drive chips, and/or one or more graphics circuits (e.g., VGA or HDMI) for an external display, or other displays. Communication circuits 78 include antennas and/or data ports and driver chips for sending and receiving communications with devices external to the computer 14, 16. Communication circuits 78 can include any one or more of WiFi antennas and circuitry, LTE antennas and circuitry, GPS antennas and circuitry, CDPD antennas and circuitry, GPRS antennas and circuitry, GSM antennas and circuitry, UMTS antennas and circuitry, and other antennas and circuitry, USB ports and circuitry (e.g., standard, micro, mini, etc.), RS-232 ports and circuitry, proprietary ports and circuitry (e.g., APPLE 30 pin and Lightning ports), RFID antennas and circuitry, NFC antennas and circuitry, bump technology antennas and circuitry, a Bluetooth antenna and circuitry, and other antennas, ports, and circuitry.

Figure 5:
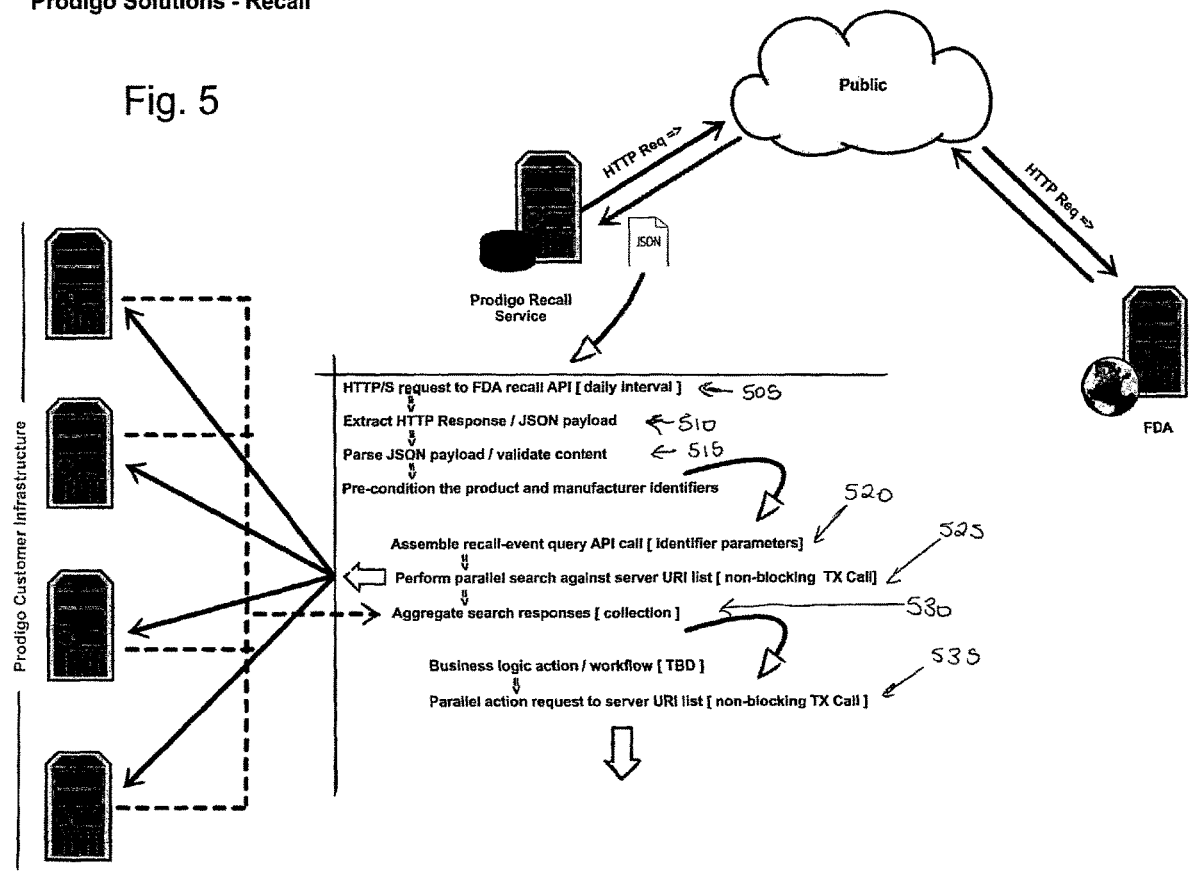
FIG. 5 is an exemplary high-level process flow diagram of an exemplary system.

Referring to FIG. 5, a flowchart of an exemplary method for identifying recall events via Web Services is provided, e.g., an exemplary embodiment of recall I/O logic 54 and unstructured data logic 56. The method may be performed by one or more components illustrated in FIG. 1, such as server processor(s) 20 of base server 12 (FIG. 2).

At step 505, a Web Service request is provided to a recall API. The request may be sent via network 18 and may be sent on a periodic basis. For example, in exemplary embodiments, recall I/O logic 54 provides an HTTP (or HTTPS) request to a recall API for the "Open FDA" project on a daily basis. In some embodiments, the requests may be sent asynchronously. For example, in exemplary embodiments, recall I/O logic 54 receives one or more notifications indicating that additional recall notifications may be available and subsequently prepare a request in response to the notification.

At step 510, the response to Web Services request is received and extracted. In some embodiments, the response may share one or more characteristics with the recall notification illustrated in FIG. 9. The HTTP response may be received via network 18 by a component that shares one or more characteristics with recall I/O logic 54. For example, in exemplary embodiments, recall I/O logic 54 provides a request to the Open FDA API at step 505, and receives a response to the request at step 510.

At step 515, unstructured data logic 56 parses the response received at step 510. In exemplary embodiments, the response is a JSON (JavaScript Object Notation) payload, and unstructured data logic 56 utilizes one or more parsing techniques to identify information in the response and associate the information with labels. For example, based on the formatting of the response, in exemplary embodiments, unstructured data logic 56 identifies one or more terms as a "product description," one or more identifying codes, and/or other information related to one or more recalled products. In exemplary systems, unstructured data logic 56 uses fuzzy logic as described herein to automatically process unstructured recall data 42 to generate resolved recall data 44, with each recall event mapped to one and only one product identifier in the product data 40.

At step 520, one or more identifiers that were identified at step 515 may be utilized to prepare a search of the product data 40 to determine whether the recalled products in the are included in the product data 40. For example, at 515, in exemplary embodiments, unstructured data logic 56 identifies a product identifier for one or more products from the response received at step 510. Unstructured data logic 56 utilizes the identified product identifiers to assemble one or more recall-event queries to determine whether, based on the identified product identifiers, the recalled products are currently in the product data 40. In some embodiments, unstructured data logic 56 may identify a new product that is being added to the marketplace and determine, based on previously identified product identifiers of recalled products, whether the new product has been the subject of a recall.

At step 525, one or more queries are provided, in parallel, to a plurality of servers that include the product data 40. In some embodiments, the queries are provided such that they are non-blocking to allow for efficient searching of multiple sources. For example, in exemplary embodiments, unstructured data logic 56 creates a plurality of search queries for a recalled product and provide the query to multiple databases simultaneously, where each database includes a unique subset of the product data 40. In exemplary embodiments, processor(s) 20 of base server 12 perform the searches of step 525.

At step 530, the search results from the queries provided at step 525 are aggregated. In some embodiments, the searches that were provided in step 525 may include multiple recalled products, and each of the searches may be provided to subsets of the product data 40, as described. The search results of all parallel searches are then combined into a single search result. In some embodiments, product search logic 52 may receive the multiple search results and combine them into a single search results set.

Once the recalled products have been identified in the product data 40, additional workflow actions may be performed to identify the products in the database(s) as "recalled products." For example, in exemplary embodiments, recall I/O logic 54 automatically sends a recall notification to one or more administrators (e.g., Product Safety Officers) that the products in the result set are recalled and that further action may be required with respect to the products. In some embodiments, database records associated with the recalled products (e.g., in memory 72) may be updated to reflect that the products are recalled. For example, in exemplary embodiments, a "status" field in memory 72 associated with product data 40 is updated to reflect "recalled" for products that have been recalled, as determined by unstructured data logic 56. In some embodiments, the recalled products, e.g., resolved recall data 44, is saved in a separate location and/or otherwise identified separately from the product data 40, e.g., in memory 72.

At step 535, the recall service leverages the eligible recall item list created from the aggregate search responses compiled in step 530 to spawn an asynchronous search event on each customer product data set 40. The eligible recall items contained in the list are then used to seed the search event on each customer environments to determine if any items in the customer's product data 40 are subject to a recall event.

Figure 6:
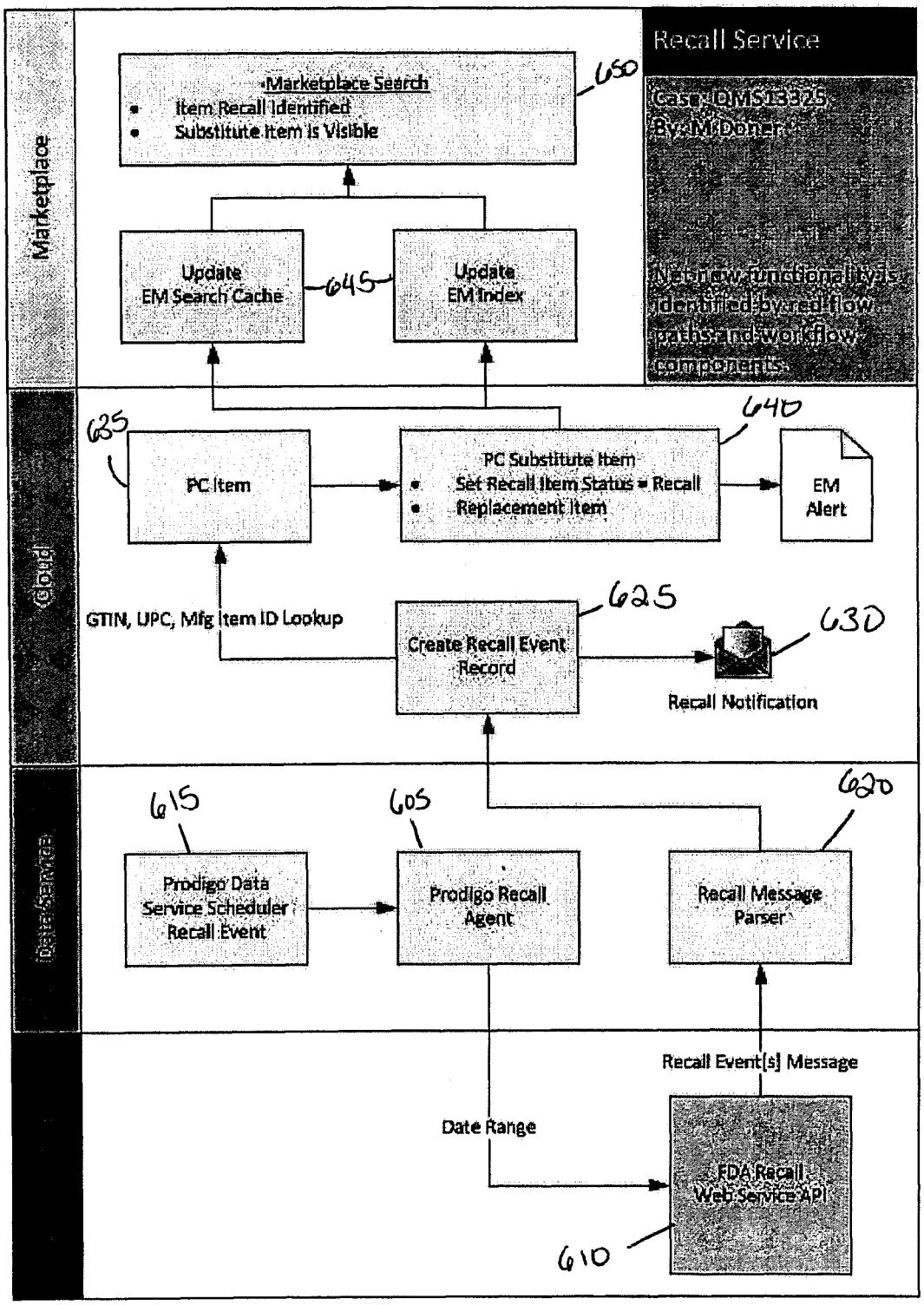
FIG. 6. is an exemplary medium-level process flow diagram of an exemplary system.

Referring to FIG. 6, another flowchart illustrating identifying a recalled product is provided. The flowchart is separated into four components, each corresponding to a different level: Marketplace, Cloud, Data Service, and External. The "Marketplace" includes the search logic 52 of the base server 12 that provides a search interface to user and provide search results to users. The "Cloud" includes data storage and the backend aspects of the search logic 52 of the base server 12 that facilitates identifying products in product data 40 and providing search results to users via the search logic 52 of the "Marketplace." The "Data Service" comprises logic to send and receive notifications and information related to recalled products. For example, the "Data Service" portions of FIG. 6 may be performed by components that share one or more characteristics with recall I/O logic 54 and unstructured data logic 56. The "External System" portion of FIG. 6 includes components of recall notification systems that are external to the system, such as the one or more recall notification providers of FIG. 1.

To monitor recall events, a recall agent 605 is created that calls a remote Web Service 610. The recall agent may be created by a scheduler 615, which may create recall agents 605 on a periodic basis to monitor the Web Service for new recall events. The recall agent 605 may be associated with a particular date range so that the recall agent 605 will not duplicate recalls that have been previously retrieved by another recall agent. For example, a recall agent 605 may only request recalls that have occurred in the 24 hours since the last recall agent was created.

The recall message parser 620 may share one or more characteristics with unstructured data logic 56. For example, recall message parser 620 may receive a JSON payload that is responsive to the recall agent 605, parse the elements of the notification, and then create a recall event record 625 based on the elements. A recall event record 625 may include information related to one or more products that may be utilized to identify the products in one or more databases. For example, a recall event record may include a manufacturer identifier, a universal product code, and/or other identifying codes that may be utilized as a search key to identify the product in one or more databases. Additionally or alternatively, one or more recall notifications 630 may be provided based on a recall event record 625. A recall notification 630 may include, for example, an email and/or other text notification to one or more users and/or administrators, indicating information related to the recall event. In exemplary systems, recall message parser 620 uses fuzzy logic as described herein to automatically process unstructured recall data 42 to generate resolved recall data 44, with each recall event mapped to one and only one product identifier in the product data 40

The recall event record 625 may be utilized to search for one or more products in one or more databases of product data. The product data may share one or more characteristics with the product data 40 of FIG. 3. In some embodiments, multiple sources may be queried utilizing a recall event record, as illustrated in FIG. 5. For example, a recall event record may be utilized to create multiple search queries, wherein each search query is provided to a separate data source. The results of the separate searches may be combined into a single search results, as described with respect to FIG. 5.

One or more substitute items 640 may be identified for the recalled item 635. In some embodiments, the substitute items 640 for recalled item 635 may be identified and indicated as substitutes by one or more administrators. In some embodiments, one or more alternative methods may be utilized to determine a suitable substitute product, as described herein.

Once a product has been identified as recalled, search caches and indexes are updated 645 so that future searches of the marketplace by users 650 will identify the products as "recalled." In some embodiments, the recalled products may be suppressed from search results. In some embodiments, recalled products will be displayed but with ordering capabilities of the products disabled. In instances where one or more substitute products have been identified for the recalled product, the substitute product(s) may be offered in search results that would otherwise provide the recalled product.

FIGS. 7A-8C are screen shots corresponding to a "before & after" use case of a search result that contains a recalled item (as defined by the FDA). The walk-through details the scenario of how an item within the Prodigo Marketplace is identified; suppressed/inactivated and subsequently its associated/substitution items are activated.

Figure 7B:
Figure 7C:
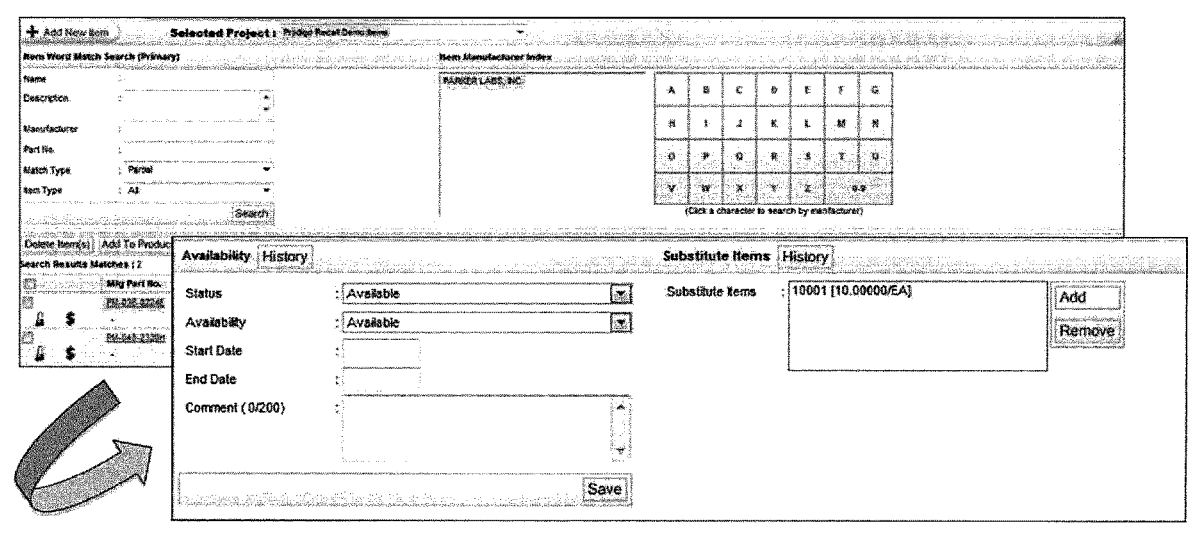

FIGS. 7A-7C are screen shots of an exemplary system before recall data has been used to determine that the target product (here, item 38-01) has been recalled by the FDA. FIG. 7A is an exemplary screen shot showing an exemplary search user interface. In this example, "Parker Probe" has been types in by the user. The user then submits the search criteria and the system determines that two products meet the search result, as shown in the exemplary screen shot of FIG. 7B. As shown in that figure, the system has indicated that item 38-01 is available for purchase (Add to Cart is active and there is no other indication to the contrary). FIG. 7C shows that using a Catalog administrative-interface (Product Console) within the Prodigo Portal instance, one can verify the item's current availability status as "available" in the product data. In this case, using Item Manager, select the catalog that houses the target recall-candidate (Prodigo Recall Demo Items), select the manufacturer 'Parker Labs Inc.' and item 'PM-038-224E,' and verify availability state from the Pricing details (lower right hand box of FIG. 7C). Also note that item 10001 has already been identified in the product data as a substitute item for the target product (here, item 38-01).

Figure 8A:
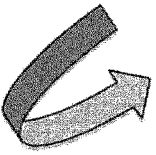
FIGS. 8A-8C are screen shots of an exemplary system after recall data has been used to determine that the target product has been recalled.
Figure 8B:
Figure 8C:

FIGS. 8A-8C are screen shots of the exemplary system after recall data has been used to determine that the target product has been recalled by the FDA and the product is configured in a manner that the system will automatically display a substitute item for the recalled item. In FIG. 8A, an administrator enables the recall service for this instance (highlighted in yellow) by checking the 'Util Enabled' check-box. In exemplary embodiments, once a recall-request event is triggered, the data service spawns a thread and makes a web-service request to the FDA's publically available recall enforcement database. The recall-service parses the JSON response, applies a natural language start-stop word-list algorithm to the unstructured item identifier data segment, and secondly, applies a distance based algorithm for manufacturer name, such as string metric for measuring the difference between two sequences, e.g., the Levenshtein or Jaro-Winkler distance between two words: the minimum number of single-character edits (i.e. insertions, deletions or substitutions) required to change one word into the other. The recall-service scans the entire active content-set looking for matches from the parsed recalled items; match-hits are aggregated using a system-wide universal unique item identifier ("UUID"), e.g., the Prodigo UUID.

In the simplest exemplary systems, the match-hit candidates are flagged for downstream manual or automatic workflow, e.g., manually or automatically selecting that (a) the recalled item be completely suppressed (not displayed to the searching user) or (b) the recalled item is not suppressed, but instead is prevented from being procured by the searching user, as shown in FIG. 8B, which is an exemplary graphical interface of a search result of an unavailable product (unavailable because of being recalled). On a subsequence search using the same search string from FIG. 7A, (or simply refreshing the search result), item 38-01 still appears in the result as before, however, the item is now flagged as being recalled. In the example of FIG. 8B, item 38-01 may not be procured (the Add to Cart icon is missing and the item is marked as "recalled" in one location and "unavailable" in another location) and a View Substitute Items link has been presented. Clicking the View Substitute Items link causes the system to display product data for the substitute item 10001, FIG. 8C. For unavailable items with configured substitution enabled, the system will automatically present to the requester alternative items. As a separate asynchronous process, alert notifications are relayed to supply-chain analyst(s) for offline follow-up and workflow related to historical procurement history of recall candidates.

In exemplary embodiments, the recall I/O logic 54 queries one or more recall data providers 19 on a periodic basis to identify recalled products. For example, referring to FIG. 9, an exemplary unstructured recall event is provided. Recall I/O logic 54 may, for example, poll a Web Service interface of the FDA daily to identify new products that have been recalled, and recall I/O logic 54 may receive unstructured recall data as a JSON payload from the FDA. FIG. 9 shows actual exemplary unstructured recall data from the FDA. The unstructured recall data from the FDA identifies various information related to a recalled product that may then be parsed by unstructured data logic 56 to identify the specific product that has been recalled. For example, in FIG. 9, the recalled product has an associated "product name," a "reason for recall," a "recall initiation date," "code information" identifying particular lots that are subject to the recall," and other identifying information for the product. Unstructured data logic 56 may receive the unstructured recall data from the FDA in the form of FIG. 9 from recall I/O logic 54, parse out the appropriate information to identify specific products utilizing fuzzy logic and/or one or more data grammar dictionaries, and provide the resolved recall data 44. Unstructured data logic 56 may further identify which of those products are currently being offered in the online catalog, and associate with those products some of the data in the recall data. For example, an unstructured data logic 56 may identify that the notification in FIG. 9 is for "Lipase reagent, 7D80" and/or identify a part or lot number based on the notification of FIG. 9, and then identify a record for "Lipase reagent, 7D80" from among the product data 40 based on a name or identifier search, and flag the "Lipase reagent, 7D80" product as a recalled product.

In exemplary embodiments, the unstructured data logic 56 uses a distance equation algorithm to resolve unstructured recall data 42 into resolved recall data 44. In exemplary embodiments, the unstructured data logic 56 uses a different algorithm to resolve the manufacturer of a recalled product in unstructured recall data 42 than the algorithm used to resolve the product identifier in unstructured recall data 42 into resolved recall data 44. For example, in exemplary embodiments, the unstructured data logic 56 uses a modified Levenshtein or Jaro-Winkler distance equation to resolve the manufacturer in unstructured recall data 42 into resolved recall data 44 for the manufacturer of a recalled product and the unstructured data logic 56 uses a stop-list regular-expression algorithm to resolve the identity of the recalled product itself in the unstructured recall data 42 into resolved recall data 44. In other exemplary systems, other algorithms and equations can be used to resolve the manufacturer from the unstructured FDA recall data. In other exemplary systems, other algorithms and equations can be used to resolve the recalled product from the unstructured FDA recall data.

With reference to the exemplary FDA JSON recall event data in FIG. 9, in an exemplary implementation, the unstructured data logic 56 uses a modified Levenshtein distance equation to resolve the manufacturer in unstructured recall data 42 into resolved recall data 44 for the manufacturer of a recalled product. The Levenshtein distance ("L-Distance") per se is a computed metric based on insertions, deletions or substitutions that measures the difference between two sequences (string expressions). In exemplary systems using the inventive teachings herein, the application and implementation of the metric within the Prodigo Recall process is based on the assumption that there exists small differences between Prodigo's Manufacturer list names (compare dictionary) vis-à-vis that of the FDA's manufacturer (recalling firm) descriptor/identifier. In the exemplary systems, the implementation contains modifications to the Levenshtein algorithm to (a) ignore "special characters" and (b) apply a higher-cost weight to the prefix of a string given the nature of spelling variants on company names. This last modification can be thought of as applying coefficients to the front end of the words to emphasize differences in the front of manufacturer names (and/or applying coefficients to the back end of the words to de-emphasize differences in the front of manufacturer names), e.g., deemphasizing a missing comma before the corporate entity or period after an entity type abbreviation (e.g., "Inc") or a corporate entity type abbreviation (e.g., "Inc.) at the end being compared to the entity type being spelled out in its entirety (e.g., "Incorporated"). Table 1 describes the phases of the algorithm implementation based on the inventive modified L-distance:

TABLE 1

| Phase | Algorithm Phase Description |
| --- | --- |
| 1 | Set len1 to be the length of s1 |
|  | Set len2 to be the length of s2 |
| 2a | initialize row 0..len1 |
| 2b | initialize column 0..len2 |
| 3 | Loop and examine each character of s1 (loop i) |
| 4 | Loop and examine each character of s2 (loop j) |
| 5 | Compute cost; if s1[i] and s2[j] are equal than cost is 0 else cost is 1 |
|  | Prefix co-efficient modification = Cost(1) – min(i,j)/max(len1,len2) |
| 6 | Compute the min value of (insertion, deletion or substitution) |
|  |    Insertion = cell value to the left + 1 |
|  |    Deletion = cell value above + 1 |
|  |    Substitution = cell diagonal above to the left + cost (from step 5) |

Assuming the successful execution of phases 1-6 (success as determined by if the computed matching value falls within a pre-defined acceptable match threshold); the modified L-distance is found in cell Matrix[len1][len2]. In this exemplary implementation, a computed distance (i.e., modified L-distance) of 0.1-1.1 transpositions is considered a match in combination with the part number. If phases 1-6 do not successfully execute (as determined by a computed matching value that falls outside a pre-defined acceptable match threshold), then a recall event execution entry is made in the recall event audit log and a recall notification is sent to the system administrator/Product Safety Officer.

Three examples with JSON recall data payload manufacture string compared vis-à-vis the manufacturer in product data 40, with scoring, weighting, and results are:

Example 1

'3M Company Inc.';
'3M Company Inc';
modified L-distance: 0.0 (a match in this example)
ordinary L-distance: 1

Example 2

'3M Company Inc.';
' 3M Company Icn.';
modified L-distance: 0.083 (a match in this example)
ordinary L-distance: 2

Example 3

'3M Company Inc.';
'M3 Company Inc.';
modified L distance: 1.80 (not a match in this example)
ordinary L-distance: 2

With reference still to the exemplary FDA JSON recall event data in FIG. 9, in another exemplary implementation, the unstructured data logic 56 uses a modified Jaro-Winkler distance equation to resolve the manufacturer in unstructured recall data 42 into resolved recall data 44 for the manufacturer of a recalled product. The Jaro-Winkler distance ("JW-Distance") is a different computed metric for measuring the difference between two sequences (string expressions) that is instead based on the number of matching characters and the number of character transpositions. In exemplary systems using the inventive teachings herein, the application and implementation of the metric within the Prodigo Recall process is again based on the assumption that there exists small differences between Prodigo's Manufacturer list names (compare dictionary) vis-à-vis that of the FDA's manufacturer (recalling firm) descriptor/identifier. In the exemplary systems, the implementation contains a modification to the Jaro-Winkler algorithm to apply a prefix-to-max-length ratio that provides a higher-cost weight to the prefix of a string given the nature of spelling variants on company names. This last modification can be thought of as applying a prefix-to-max-length ratio to further emphasize differences, even in shorter strings, in the front of manufacturer names (and/or applying coefficients to the back end of the words to de-emphasize differences in the front of manufacturer names), e.g., deemphasizing a missing comma before the corporate entity or period after an entity type abbreviation (e.g., "Inc") or a corporate entity type abbreviation (e.g., "Inc.) at the end being compared to the entity type being spelled out in its entirety (e.g., "Incorporated"). Table 2 describes the phases of the algorithm implementation based on the inventive modified JW-distance:

TABLE 2

| Phase | Algorithm Phase Description |
|---|---|
| 1 | Set len1 to be the length of s1<br>Set len2 to be the length of s2 |
| 2a | 2a - initialize row 0..len1 |
| 2b | 2b - initialize column 0..len2 |
| 3 | Set range to max(len,len2)/2-1 |
| 4a | Loop and examine each character of s1 (loop i) |
| 4b | Loop and examine each character of s2 (loop j) |
| 4c | Create set of matches match1: if s1[i] == s2 [j] and \|j-1\| ≤ range then add s1[i] to match1 |
| 5a | Loop and examine each character of s2 (loop i) |
| 5b | Loop and examine each character of s1 (loop j) |
| 5c | Create set of matches match2: if s2 [i] == s1[j] and \|j-1\| ≤ range then add s2 [i] to match2 |
| 6 | Set transpositions = 0 |
| 7a | Loop and examine each character of match1 and match 2 (loop i) |
| 7b | If match1[i] != match2[i] then transpositions++ |
| 8 | transpositions = transpositions /2 |
| 9 | Jaro Distance: dj = (len(match1) / len1 + len(match2) / len2 + (len(match1) − transpositions)/len(match1))/3 |
| 10 | Set prefix = 0 |
| 11a | Loop and examine each character of s1 (loop i) |
| 11b | Loop and examine each character of s2 (loop j) |
| 11c | If s1[i] == s2[j] and prefix < 4 then prefix++<br>Else break |
| 12 | Winkler Distance: dw = dj + prefix*(1-dj) |
| 13 | prefixRatio = floor(prefix/len1*len2)<br>maxLen = max(len1,len2); minLen = min (len1,len2) |
| 14 | Pope Distance: If dj < 0.7 then dp = dj<br>Else if (prefixRatio + prefix ≤ maxLen) and maxLen!= minLen then dp = dj + min(0.1, 1 / maxLen) * (prefix + prefixRatio) * (1 − dj)<br>Else dp = dj + min(0.1, 1 / maxLen) * prefix * (1 − dj) |

In step 14 of the process in Table 2 above, the coefficient 0.7 used in determining the final "Pope Distance" has been found to achieve the best results. It should be appreciated, however, that deviation from 0.7 will likely still achieve better results than the JW distance alone, provided that the coefficient cannot exceed 1.0. The above process is not meant to be limited to use of a 0.7 coefficient. Likewise, the prefix length 4 in step 11c has been found to return superior results, but the invention is not limited to use of that exact value.

In this exemplary implementation, a computed distance (i.e., modified JW-distance) of greater than 0.94 is considered a match in combination with the part number. If a distance less than or equal to 0.94 is returned, then a recall event execution entry is made in the recall event audit log and a recall notification is sent to the system administrator/Product Safety Officer.

Three examples with JSON recall data payload manufacture string compared vis-à-vis the manufacturer in product data 40, with scoring, weighting, and results using modified JW-distance are:

Example 1

'depuy synthes sales, inc. (a johnsonandjohnson co.)'
'depuy synthes usa'
Score: 0.951111111111111

Example 2

'Airgas, Inc.'
'Airpal, Inc.'
Score: 0.896296296296296

Example 3

'3M Company Inc.'
'M3 Company Inc.'
Score: 0.972222222222222

Although they have not actually been implemented or tested, it is believed that the following algorithms could be modified using the teachings herein and used to resolve the manufacturer in unstructured recall data 42 into resolved recall data 44 for the manufacturer of a recalled product: (a) Smith-Waterman Distance; and (b) Viterbi decoding method. As with the modified L- and JW-distances described above, these would be modified to (a) ignore "special characters" and (b) apply a higher-cost weight to the prefix of a string given the nature of spelling variants on company names. Again, this last modification can be thought of as applying coefficients to the front end of the words to emphasize differences in the front of manufacturer names (and/or applying coefficients to the back end of the words to de-emphasize differences in the front of manufacturer names), e.g., deemphasizing a missing comma before the corporate entity or period after an entity type abbreviation (e.g., "Inc") or a corporate entity type abbreviation (e.g., "Inc.) at the end being compared to the entity type being spelled out in its entirety (e.g., "Incorporated").

With reference to back the exemplary FDA JSON recall event data in FIG. 9, in an exemplary implementation, the unstructured data logic 56 uses a stop-list regular-expression algorithm to resolve the identity of the recalled product itself in the unstructured recall data 42 into resolved recall data 44. Unlike the "manufacturer name" descriptor, the Levenshtein and Jaro-Winkler distance equations are not ideal for parsing "manufacturer part number" descriptors due to the nature of them not being a natural-language sequence. Accordingly, the algorithm used by the Recall-Event Engine (e.g., unstructured data logic 56) for parsing the unstructured part number strings in this exemplary implementation is based on a token identifier dictionary mechanism. In order to be parsed (detected), part number tokens must be prefixed with a token identifier and not include "stop words" with an assumed convention of alpha-numeric or numeric-only. The original unstructured string is tokenized by using common delimiters (e.g., comma, semi-colon, space, colon, etc.). Table 3 describes the phases of the algorithm implementation based on the inventive algorithm:

TABLE 3

| Phase | Algorithm Phase Description |
|---|---|
| 1 | Initialize Collect to 0 |
|   | Initialize special_chars to dictionary of characters |
| 2a | Parse pattern [s] to non-whitespace array [arr] /[`s|;|:|,]]/ |
| 2b | Initialize match regular expression to ([a-z$special_chars\d]+) |
| 3 | Loop and examine each word-boundary string with [arr] |
|   | arr[i] Identifier-token = switch Collect to 1 |
|   | arr[i] (!= Identifier-token || Stop-word) && Reg-Exp match = Reg-exp match |
|   | arr[i] (!= Identifier-token || Stop-word) && not Reg-Exp match = switch Collect to 0 |

Assuming execution of phases 1-3 (success as determined by a non empty result-set); product part number candidates are collected and will represent the search-set for a particular recall event. Examples of token identifiers include Part, Number, Model, Sku, UPC, UNSPSC, No., etc. A match is determined by parsing the entire string into a one dimensional array by word boundary characters (i.e. space(s) and other special characters; the array is looped and when a start word is encountered, collection begins for the next array element providing that string contains either numeric or alphanumeric (and not alphabetical characters without numeric characters). In the case of an alphabetical character-only string, as the "next" string being encountered the collection stops.

The fullness of the dictionary impacts the ability of the parser to detect potential part numbers. For example, a parser may collect the part number (underlined strings) from the following string utilizing the following start and stop locations (in brackets, not a part of the original parsed string): Model/Catalog/Part [start]Number: [stop] Accu-Chek Combo Kit mg US/English [start]version, [collect] 05458544001[stop] Accu-Chek Combo Kit mg US/Spanish [start]version, [collect]055004686001[stop] Accu-Chek Spirit Combo Replacement Pump US/EN, 05391512001 Accu-Chek Spirit Combo Demo Pump—US, 0539175000.

The content provide by the FDA appears to contain potential part number identifiers in either [Code_Info] or [Product_Desciption]; the exemplary implementation of parsing, as described above, is only examining these two fields of data. Two examples with JSON recall data payload data compared vis-à-vis the manufacturer in product data 40, with scoring, weighting, and results are:

Example 4

[Code_Info]=Lot numbers:83496A22 88716A22 95040822 95889A22 Exp. 01/19/2013

[Product_Desciption] ADVIA Centaur Calibrator C-Used with the ADVIA Centaur Ferritin assay on the ADVIA Centaur CP system only. (In-Vitro Diagnostic)

Catalog [start]Number: [collect]672182005 ([stop]US Reference 6 pack) (a match)

Example 5

[Code_Info]=lot FA5154, exp. 2015-06-03

[Product_Desciption]=" siemens Dimension Phenytoin Flex Reagent Cartridge

The PTN method used on the Dimension clinical chemistry system is an in vitro diagnostic test intended to measure phenytoin (dilantin, diphenylhydantoin), an anti-epileptic drug, in human serum and plasma. PTN test results are used in the diagnosis and treatment of phenytoin overdose and in monitoring levels of phenytoin to ensure appropriate therapy." (not a match)

Additional or alternative algorithms may be modified using the teachings herein and used to resolve the recalled product in unstructured recall data 42 into resolved recall data 44 for the recalled product itself. For example, a Jaro-Winkler distance algorithm may be modified and utilized in a similar manner as described herein.

An APPENDIX provides exemplary pseudocode for an exemplary implementation of a recall-event engine.

As described above, the various embodiments of the unstructured data logic 56 are used to resolve unstructured recall data 42 into resolved recall data 44. In addition, or in the alternative, the unstructured data logic 56 embodiments can be used to process user-enter query search strings, such as those entered in a user interface like FIG. 7A.

Substitute products includes products that have been identified for products that have been identified as substitutes for products that are currently unavailable for purchase via the online catalog of products. Substitute products may be identified as substitutes for cataloged products via hand curation of unavailable products. For example, unstructured data logic 56 may identify a product that is recalled and send a notification to one or more administrators, alerting them that the product has been recalled. Similarly, a notification may be provided when a product is otherwise unavailable. An administrator may then indicate one or more alternative products to identify as substitute products for the recalled product.

In exemplary embodiments, substitute product logic 58 (FIG. 3) determines one or more substitute products for an unavailable product based on one or more attributes of the unavailable product. For example, substitute product logic 58 may be provided with information related to an unavailable product, such as a product name, description, purchasing history of users that have purchased the product, and/or other information indicative of why a user may select that product for purchase. The substitute product logic 58 may then determine, based on the attributes of the product, one or more products that may be acceptable substitute products for the unavailable product. For example, unstructured data logic 56 may identify "Product A" as unavailable because it has been recalled and provide substitute product logic 58 with "Attribute 1" and "Attribute 2" of "Product A." Substitute product logic 58 may search available product data 40 and further identify products that also have "Attribute 1" and "Attribute 2" and/or that most closely match the provided attributes as substitute products.

In some embodiments, substitute product logic 58 uses contract data in the product data 40 to determine a substitute product and/or to limit or otherwise rank substitute products for an unavailable product. Contract data includes information related to products contracts with vendors of cataloged products. For example, contract data may include bulk purchasing agreements that allow for discounted pricing on purchases of products if a threshold of products is purchased. As an example, a vendor of "Product B" may charge $100.00 per product if less than 1,000 of "Product B" is purchased, and a price of $99.00 if more than 1,000 of "Product B" is purchased. Contract history data in product data 40 may include the number of "Product B" that has been ordered by the user in the past and/or that has currently been ordered and not yet fulfilled. Substitute product logic 58 may determine that both "Product B" and "Product C" are suitable substitutes for "Product A" based on shared attributes between those products (or simply because they have been manually identified as suitable substitutes for "Product A" as with FIG. 7C). In some embodiments, substitute product logic 58 may determine that "Product B" is a more suitable substitute because, based on the contract data and the contract history data, the user would get a better price and/or trigger a bulk discount if the user selected "Product B" as a substitute. In some embodiments, both "Product B" and "Product C" may be identified as substitute products for "Product A," but ranked to identify a preference for "Product B" over "Product C."

Product search logic 52 receives search parameters from computers 16 and returns a result set to computer 16 that is responsive to the provided search. For example, a user uses a program, such as a web browser, to enter search parameters to locate one or more cataloged products in the product data 40. Product search logic 52 uses one or more search algorithms to search the product data 40 and/or resolved recall data 44 to determine which products are responsive to the search and available. Product search logic 52 uses various attributes associated with products to determine which products are responsive to a search request. For example, product search logic 52 may compare search terms with product names, part numbers, product descriptions, and/or other attributes of products to determine which products are responsive to a search.

In some embodiments, product search logic 52 uses a fuzzy logic algorithm to determine potential matches to products and/or substitute product logic 58 uses a fuzzy logic algorithm to determine potential substitute items. The fuzzy logic algorithm applies a grammar dictionary, similar to the grammar dictionary that was discussed in connection with the unstructured data logic 56, to parse one or more key data attribute values from a recall notification. The algorithm may then apply fuzzy matching logic using one or more distance algorithms to increase match hit rates on look-up key values based on acceptable distance matching thresholds between the identified data attribute values of the recalled product and one or more potential matches. Potential matches that satisfy a threshold matching value may be selected as substitute products for the recalled product. In some embodiments, a human curator may further verify the matches before the matching products are identified as substitute products. Similarly, products search logic 52 uses a fuzzy logic algorithm to identify potential matches to a user-provided search query. For example, products search logic 52 uses a fuzzy logic algorithm to identify potential matches to a manufacturer name and/or a product identifier that would otherwise be missed as a potential match utilizing a traditional search algorithm.

In some embodiments, products search logic 52 may rank one or more products in a search result before providing the user with the results via computer 16. For example, products search logic 52 may rank products based on one or more matching scores and/or matching coefficients that were determined by the search algorithm utilized to determine the matches. Also, for example, products search logic 52 may rank products so that products from preferred vendors and/or products that are subject to a bulk discount may be promoted in provided ranked search results.

In some embodiments, products search logic 52 uses contract data and/or contract history data to determine rankings of products. For example, when determining a search result set to provide a user via computer 16, products search logic 52 may identify products in the search result set that are from preferred vendors and/or products that are associated with a bulk discount agreement, and promote those products in a search result set. In some embodiments, products search logic 52 may prune a result set before providing the results to the user via computer 16 to remove products that are not associated with a preferred vendor and/or that are not associated with a bulk purchase agreement. For example, a search result may include two results, one with a purchasing agreement that is close to being fulfilled and a second product that is not associated with a bulk purchasing agreement. Product search logic 52 may rank the second product lower in a provided result set and/or may remove the product from the result set that is provided to the user based on the contract data and/or contract history data indicating that, if the user were to select the first result for purchase, an agreement that would reduce the purchasing price would be closer to fulfillment.

In some embodiments, products search logic 52 may identify one or more unavailable products in a search results set. The unavailable products may be, for example, labeled as "backordered," "no longer available," "discontinued," and/or some other indication of unavailability. In some embodiments, the unavailable product may be a recalled product, and the product may be labeled as such in resolved recall data 44 based on previous recall notifications by unstructured data logic 56, as described herein. In some embodiments, unavailable products may be included in search results and labeled as "UNAVAILABLE," as described herein. In some embodiments, the unavailable products may be removed from search result sets.

In some embodiments, products search logic 52 may identify one or more substitute products as replacements for unavailable products in the search result set. For example, products search logic 52 may first identify an unavailable product as responsive to the search query of the user. Products search logic 52 may then identify one or more substitute products that have been previously identified as described herein. Products search logic 52 may then include the substitute product(s) with one or more other search results in a result set that may be provided to the user.

Product search logic 52 may then provide the user via computer 16 with a display indicating the search results responsive to the query of the user. In some embodiments, items that are unavailable may be provided to the user such that the user may not select one of the unavailable products. For example, a product that is returned in a search result set that has been recalled may be labeled "unavailable" or "recalled," and the user may be limited from selecting that product (e.g., portions grayed out or missing from graphical interface). For example, referring to FIG. 8B, an exemplary search result for an item is provided. The item is marked as "UNAVAILABLE" to indicate to the user that the product is unavailable for purchase. In some embodiments, the "Quantity" text box may be grayed out or missing from the provided search result to further indicate to the user that the product may not be ordered. In some embodiments, the unavailable product may not be provided at all in the search results. For example, the search results may be pruned of all unavailable products before the results are provided to the user for display via computer 14.

In some embodiments, one or more methods may be utilized by search logic 52 to determine a score indicative of two strings matching each other. Some methods may result in a binary score, such as for example, a value of 1, "true," "yes," and/or a similar value to indicate that two given strings match exactly, whereas a different value (0, "false," "no") may be provided if the two given strings are not the same. In some embodiments, search logic 52 may determine a binary score indicative of whether two strings match based on the matching of the strings satisfying a threshold. For example, two strings may match and/or a binary score indicative of matching may be determined for two strings if a threshold percentage of characters in the strings match and/or that a threshold number of characters at each position of the strings match, and/or one or more other methods for determining similarity between two strings.

In some embodiments, search logic 52 may include one or more methods to determine a score that is indicative of a match between two or more strings. For example, one or more "fuzzy logic" methods may be utilized to determine a score between 0 and 1, with scores closer to 0 being more indicative of non-matches between the strings (and, conversely, scores closer to 1 being indicative of closer matches). In some embodiments, the scores of a fuzzy logic method of determining matches may be utilized to further determine a binary score (i.e., match if score is above a threshold, resulting in a score of 1, "true," and/or "yes").

In some embodiments, a Levenshtein Distance method may be utilized to determine a score indicative of whether two strings match. For example, for strings that may be entered by a user to search for products utilizing the system described herein, the user may enter the string "Abbott Laboratories Inc" with the intention to search for one or more products that are manufactured by the referenced company. However, the product data 40 may include one or more products with the company name stored as "Abbott Laboratories," "Abbott Laboratories, Inc.," and/or one or more other combinations of the referenced terms, abbreviations for one or more of the terms, and/or one o more alternative terms. By executing the Levenshtein method, search logic 52 may determine a score indicative of similarity between the user-entered string and the stored name for the company, which may be, for example, 0.416. This score may be utilized to determine, for example, if the user intended the company "Abbott Laboratories Inc" based on the entered string. The system may determine that the user did mean "Abbott Laboratories, Inc" if, for example, the resulting score is above a threshold, such as 0.4. As another example, a user may submit the string "M3 Company" while instead intending to enter "3M Company," a commonly known name for a manufacturer of products. The Levenshtein method may result in a score of 0.7, which may be indicative of a strong likelihood that the user intended "3M" while accidentally typing "M3."

In some embodiments, the Levenshtein method may be altered such that a higher-cost weight may be assigned to the prefix of a string, given the nature of spelling variants on names of companies and/or products. In some embodiments, the system may utilize a Levenshtein method but, when a company name is submitted by a user in addition to a part number, a computed distance of 0.1-1.1 transpositions may be considered a match. Thus, minor misspellings of the prefix of a string (i.e., the company name) may be weighted less when considering matches than substrings towards the end of a submitted string.

For example, a submitted string may be "Abot ABC12345," with "Abot" being a misspelled variation of "Abbott" and "ABC12345" being a part number that is of interest to the user. The modified Levenshtein method may weigh the first part of the string differently than the second part of the string. For example, the product data 40 may include the string "Abbott ABC12345" as an acceptable match to a particular product stored in the database. The system may then determine that, although "Abot" and "Abbott" are not strong matches (or at least strong enough alone to be indicative of a match), the fact that the second part of the strings (both including "ABC12345") are identical, the system may determine that there is a high likelihood that the user intended the product associated with "Abbott ABC12345" when he submitted "Abot ABC12345." The system may assign a score to the set of strings that is indicative of a likely match and one or more of the components of the system may provide the user with the product associated with "Abbott ABC 12345."

In some embodiments, search logic 52 may include a Jaro method that may be utilized to determine the likelihood that a submitted string matches a saved string. The Jaro method computes the distance between two strings by comparing the strings character to character. In the Jaro method, a match is defined as two identical characters that are not separated by more than a given maximal length. A Jaro distance method determines a scoring for a pair of strings based on the number of transformations required to manipulate one string into a second string.

In some embodiments, a Jaro-Winkler method may be utilized to determine the likelihood that a user-submitted string matches a given string. The Winkler method is similar to the Jaro method except the Winkler method includes an additional factor that makes the score more indicative of a match based on similarity between the prefix of the two given strings. In some embodiments, the Jaro-Winkler method may be further enhanced to provide a coefficient to shorter strings.

In still further embodiments, the Jaro-Winkler method may be altered such that a prefix-to-max-length ratio is used to place further emphasis on matching prefixed, especially in shorter strings. For example, a user may submit the string "depuy synthes usa." The system may have the string "depuy synthes sales, inc. (a johnsonandjohnson co.)," which may be the complete name of a manufacturer of one or more products that are saved in the database. Although the Levenshtein method and the Jaro-Winkler method may result in lower matching scores (due to the dissimilarity of the second portion of the strings), the modified Jaro-Winkler method puts a greater emphasis on the prefixes of the strings, thus resulting in a greater similarity match. In some embodiments, a modified Jaro-Winkler score of more than 0.94 is considered a match.

As another example, the user may submit the string "Airgas, Inc." and the system may compare the string to, for example, a string of "Airpal, Inc." that is stored in the database and associated with a product. Note: in this example, "Airgas" and "Airpal" are separate companies and it is the intention of the user to search for products associated with "Airpal." The modified Jaro-Winkler method may determine that, because dissimilarities between the strings occur earlier in the string (i.e., "gas" versus "pal"), the likelihood that the user intended "Airpal" when submitting "Airgas" may be less than the likelihood that two strings with identical prefixes match (such as "Airpal" and "Airpak"). Therefore, the method may result in the pair of strings being assigned a similarity score indicative of the string prefix match. One or more components may then provide information related to the matched string if the score is indicative of a high likelihood of a match.

In some embodiments, scores associated with strings identified from the database may be utilized to determine whether to provide the user with information related to the strings. In some embodiments, one or more search results may be ranked based on scores associated with string matches. For example, a user may submit the string "Airpal" and one or more components may search the database to determine matches to the string. The database may identify the string "Airpal" in the database, perform the modified Jaro-Winkler method, and assign a matching value of 1.0 (indicative of an exact match). Additionally, one or more other strings that are associated with products in the database may be compared against the submitted string. As previously explained, for example, the string "Airpak" may be compared to the submitted string and a match value of 89 may be determined for the non-likelihood of a match. Products may be provided to the user in an ordered list, and the order of the products in the list may be determined based on the scores. For example, "Airpal"-related products may be provided in a more prominent position in the provided list than "Airpak"-related products.

In addition to being utilized to determine one or more likely products from the product data 40 that may be related to a user-submitted search, one or more methods described herein may be utilized to determine whether unstructured recall data 42 includes references to product 40. For example, in some embodiments, unstructured recall data 42 may be received from one or more sources, and the recall data 42 may include one or more incorrectly spelled products and/or manufactures, and/or the unstructured recall data 42 may include non-standard names for products and/or manufacturers. For example, an entry in the unstructured recall data 42 may include "Abbott Labs" as a manufacturer, whereas the product data 40 may include an identifier of "Abbott Laboratories." One or more of the methods described herein may be utilized to assess the likelihood that the two entries are indicative of the same entity if, for example, a matching score computed for the two strings satisfies a threshold score.

In some embodiments, unavailable search results may be provided with an indication that substitute items are available, as described herein. For example, referring again to FIG. 8B, the search result is provided with an indication of "View Substitute item(s)." The user may select the indication and be directed to one or more items that have been previously identified as substituted products for the item, as described herein. In some embodiments, substitute products may be provided as search results without any indication to the user that the product is a substitute product. For example, the user may be provided with a list of ten products as a search result set, where nine of the products are responsive to the provided search and one of the products is a substitute for a product that is responsive to the search. The user may be provided all ten of the products in the same manner, without any indication that one of the products is a substitute.

It will be appreciated by one of ordinary skill in the art that the methods disclosed herein are not limited for use with FDA-recall data, but can be used to facilitate import of any data into an existing data set. In one embodiment, the present invention can be used import pure content, such as importing catalog data based on manufacturer or spending data based on payee or payor. In such embodiments, if the name of a company, product or other field in the import data is found to exist in the current data (using the above-described methods), then the import data may be appended to or used to update the existing data. If no matching entry exists in the current data, then a new entry can be made by importing the data. In another embodiment, the present invention can be used to cross-reference subsets of existing content data, for example, to cross-reference contracts in a contract management system by company name. In this embodiment a new file or data set can be written that contains all data entries that relate to the same key value, for example, all contracts that involve a specific party.

Some of the steps, acts, and other processes and portions of processes are described herein as being done "automatically." In the alternative, or in addition thereto, those steps, acts, and other processes and portions of processes can be done with one or more intervening human acts or other manual acts that eventually trigger the mentioned step(s), act(s), and/or other process(es) and/or process portion(s).

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, the base server 12 and/or computers 14, 16, 20, 20 can be modified to include logic to perform any one or more of the various functions and processes herein. As another example, although the examples herein are related to medical product cataloging, all of the various functions and methods herein can be applied to any field of product. As still another example, the recall notification may be utilized in a system that provides a marketplace for food products and monitors food product recall events. As yet still another example, the recall notification functionality may be utilized to monitor drug recall events. As another example, the steps of all processes and methods herein can be performed in any order, unless two or more steps are expressly stated as being performed in a particular order, or certain steps inherently require a particular order. Accordingly, departures may be made from such details without departing from the spirit or scope of the applicant's general inventive concept.

Appendix

Recall-Event Engine—Pseudocode

The following document outlines the code flow related to the recall-event to the FDA and the workflow action-events. The Recall-Event engine provides an automated mechanism to continually ensure that Prodigo Marketplace catalog items that have been recalled by a manufacturer are flagged and, optionally, accompanied by some downstream workflow to ensure the continued procurement of recalled items is minimized.

This document makes use of Prodigo's Transaction Console (TX)[1] integration tool-set.

---

This document makes use of Prodigo's Transaction Console (TX)[1] integration tool-set.

```
Instantiate( )
    Recall_Request object as rr
        start_date, end_date, result_limit, enforcement_type
        fda_uri
Instantiate( )
    HTTP_Client object as ua
        ->get(<uri>)
        ->res(<payload>)
```

-continued

This document makes use of Prodigo's Transaction Console (TX)[1] integration tool-set.

```
Make HTTP request HTTP_Client->get(rr->fda_uri)
Instantiate( )
Parse( ) JSON payload[2] response to HASH data structure
    ua->res->json = r
        r{fda event id} =
            [
                recalling_firm
                product_desciption
                code_info
                reason_for_recall
                recall_initiation_date
                event_id
                recall_number
            ]
Instantiate( )
    Recall_Candidate object as rc
        product_identifier, recalling_firm
Loop( )
For each recall event r{fda event id} - START
    If r->recalling_firm matches Manufacturer_List[3]
        Continue( )
    Parse( ) unstructured product identifier strings
        Product_Parse( )[4] r->product_description && r->code_info
    If Parse( ) returns a validate Product_Identifier_List
        Add( ) to HASH of Recall_Candidate
For each - END
Instantiate( )
    Server_Cluster Array of objects as sc
        search_pipeline_uri, recall_pipeline_uri
Instantiate( )
    Recall_Search_Response object as sr
        product_identifier, product_guid, recall_event_id, success
Loop( )
For each Recall_Candidates - START
    Parallel_Loop( )
    For each product candidate - START
        Instantiate( )
            HTTP_Client object as ua
                ->get(<uri>)
                ->res(<payload>)
        Loop( )
        For each server cluster - START
            Instantiate( )
            Make HTTP request ua->get(sc->search_pipeline_uri)
            Parse( ) response from TX search pipeline
            If Parse( ) returns success or failure
                Add( )
                    Append to HASH of Recall Search_Response
                        sr->product_identifier
                        sr->product_guid
                        sr->recall_event_id
        For each - END
    For each - END
For each - END
Loop( )
For each server cluster - START
    Parallel_Loop( )
    For each recall search response - START
        Instantiate( )
            HTTP_Client object as ua
                ->get(<uri>)
                ->res(<payload>)
        Instantiate( )
            Recall_Product object as rp
                guid,message
                rp->guid = sr->product_guid
        Make HTTP request ua->get( [rp->guid, rp->message])
        Parse( ) response from TX search pipeline
        If Parse( ) returns success or failure
            Sync( )
                Sync success to HASH of Recall_Search_Response
                    sr->success
    For each - END
For each - END
Loop( )
For each recall search response - START
```

-continued

This document makes use of Prodigo's Transaction Console (TX)[1] integration tool-set.

```
    If sr->success
        Notification workflow[5]
For each - END
```

[1]TX is a task-transaction engine (a 'task' is defined as a pre-assembled workflow with specified inbound parameters, a data/event operation and an expected output) that provides for decoupled tasks to be assembled into a linear execution order known as a 'pipeline'.
[2]See FIG. 9 - FDA JSON Sample Payload.
[3]Manufacturer List - Represents predefined list of valid manufacturers; discussed above in product data 40
[4]Product Parse - See above for exemplary embodiments and algorithms
[5]Notification Workflow - discussed above

What is claimed is:

1. A method comprising:
receiving a request for a medical product from a remote customer computer, wherein the request includes a product identifier of the medical product;
providing the request to a search engine;
receiving, in response to the providing, a plurality of matching products;
transmitting the plurality of matching products to a first display on the remote customer computer;
identifying a recalled product from the plurality of matching products, wherein the recalled product is identified based on a unique identifier of the recalled product matching a unique identifier of a product in a recalled medical item list;
identifying one or more characteristics of the recalled product;
determining one or more potential substitute products based on the one or more characteristics,
wherein the one or more potential substitute products are not included with the plurality of matching products;
transmitting the recalled product and a result set to a second display on the remote customer computer,
wherein the second display indicates that the recalled product is subject to a recall, but the second display does not provide a user interface for the consumer to purchase the recalled product,
wherein the result set includes a user interface for the consumer to purchase a subset of the plurality of matching products, and
wherein the result set further includes a user interface for the consumer to purchase the one or more potential substitute products.

2. The method of claim 1, wherein the recalled medical item list is determined based on parsing one or more web service recall notifications.

3. The method of claim 1, wherein the recalled medical item list is determined based on parsing one or more text-based alert messages.

4. The method of claim 1, wherein the one or more characteristics includes at least one of manufacturer, cost, and purpose.

5. The method of claim 1, further comprising:
generating an interactive display that includes the result set and from which the customer can select a medical product for purchase; and
transmitting the interactive display to a remote computer of the customer.

6. The method of claim 5, wherein the interactive display comprises HTML code.

7. The method of claim 1, wherein the step of identifying a recalled product comprises parsing at least one web service recall notification.

8. The method of claim 1, wherein the step of identifying a recalled product comprises parsing at least one text-based alert message.

9. The method of claim 1, further comprising:
receiving unstructured recall event data payloads;
applying a data grammar dictionary to parse data attributes and values from unstructured recall event data payloads to identify specific products identified as subject to a recall in the unstructured recall event data payloads; and
storing on at least one non-transitory computer readable storage devices corresponding data identifying the specific products identified as subject to a recall in the unstructured recall event data payloads.

10. The method of claim 9, wherein applying a data grammar dictionary to parse data attributes and values from unstructured recall event data payloads comprises applying a data grammar dictionary to parse manufacturer name and product identifiers from unstructured recall event data payloads to identify specific products identified as subject to a recall in the unstructured recall event data payloads.

11. The method of claim 9, wherein applying a data grammar dictionary to parse data attributes and values from unstructured recall event data payloads includes determining whether a value of a first character-based data field of a first data set and a second character-based data field of a second data set are substantially similar, wherein each of the first and second character-based data fields comprise a plurality of characters, the method further comprising:
determining a first distance value between the first and second character-based data fields by:
comparing each character of the first character-based data field to each character of the second character-based data field and storing a set of matching characters in a first array on one or more non-transitory computer readable storage devices;
comparing each character of the second character-based data field to each character of the first character-based data field and storing a set of matching characters in a second array on one or more non-transitory computer readable storage devices,
providing the first distance value based on a length of the first array and a count of transposed characters between the first and second arrays;
determining a second distance value between the first and second character-based data fields based on the first distance value and a comparison of a prefix of each of the first and second character-based data fields;
determining a third distance value based on the second distance value and a ratio a length of the prefix to a length of the longer of the first and second character-based data fields;
determining whether the value of the first and second character-based data fields are substantially similar based on the third distance value.

12. The method of claim 11, further comprising storing on at least one non-transitory computer readable storage device data relating to the first character-based data field, wherein the data is stored relationally to the second character-based data field if it is determined that the value of the first and second character-based data fields are substantially similar based on the third distance value.

13. The method of claim 9, wherein applying a data grammar dictionary to parse data attributes and values from unstructured recall event data payloads comprises applying fuzzy matching logic using distance algorithms to increase match hit rates on look-up values based on acceptable distance match thresholds to identify specific products identified as subject to a recall in the unstructured recall event data payloads.

14. The method of claim 13, wherein applying a data grammar dictionary to parse data attributes and values from unstructured recall event data payloads comprises applying a data grammar dictionary to parse manufacturer name and product identifiers from unstructured recall event data payloads to identify specific products identified as subject to a recall in the unstructured recall event data payloads.

15. The method of claim 13, wherein the using distance algorithms to increase match hit rates on look-up values comprises ignoring a predefined set of characters.

16. The method of claim 13, further comprising storing on at least one non-transitory computer readable storage device, names of companies offering the one or more potential substitute products, wherein the using distance algorithms to increase match hit rates on look-up values comprises applying a higher-cost weight to a prefix of a string of an unstructured recall event data payload based on spelling variants of the stored names of companies.

17. The method of claim 16, wherein the higher-cost weight is based on a ratio between the prefix and a predefined maximum string length.

* * * * *